United States Patent [19]
> Kadin

[11] Patent Number: 4,694,466
[45] Date of Patent: Sep. 15, 1987

[54] TIME SHARING FREQUENCY SYNTHESIZER

[75] Inventor: Joseph Kadin, Morris, N.J.

[73] Assignee: ITT Defense Communications, a Division of ITT Corporation, Nutley, N.J.

[21] Appl. No.: 740,603

[22] Filed: Jun. 3, 1985

[51] Int. Cl.⁴ ............................................. H04L 27/26
[52] U.S. Cl. .......................................... 375/1; 455/76; 455/183; 331/179; 370/29
[58] Field of Search ......................... 375/1, 2.2, 88, 45, 375/58, 23; 455/165, 189, 209, 76, 82; 331/179; 328/14; 370/29, 38

[56] References Cited

U.S. PATENT DOCUMENTS

| | | | |
|---|---|---|---|
| 4,030,033 | 6/1977 | Bibl et al. | 375/1 |
| 4,079,378 | 3/1978 | Hulderman | 455/82 |
| 4,193,030 | 3/1980 | Rabow et al. | 375/1 |
| 4,267,592 | 5/1981 | Craiglow | 370/29 |
| 4,309,703 | 1/1982 | Blahut | 375/23 |

OTHER PUBLICATIONS

P. J. Lautier; Time Division Duplex Radio Telephone Network, Technical Revue Thomson-CSF, vol. 10, No. 3, 9/78.
Mason et al., Improvements in Multicoupler Systems, European Patent Application, Derwent Publications Ltd.; 1/86.

Primary Examiner—Robert L. Griffin
Assistant Examiner—M. Huseman
Attorney, Agent, or Firm—Robert A. Walsh; Mary C. Werner

[57] ABSTRACT

A frequency synthesizer circuit operates in a time shared mode. Thus the frequency synthesizer circuit operates to transmit and/or receive a particular frequency for a chosen small amount of time and then sequentially transmits and/or receives the other frequencies for chosen small amounts of time. After all the chosen frequencies have been transmitted and/or received the synthesizer circuit will return to the first of frequency and begin to repeat the process in cyclical fashion.

7 Claims, 3 Drawing Figures

TIME SHARING FREQUENCY SYNTHESIZER

BACKGROUND OF THE INVENTION

1. Field of the Invention

The present invention relates to a time sharing frequency synthesizer having general application in several types of communications systems.

2. Description of the Prior Art

U.S. Pat. No. 4,479,248, issued to Caspari et al, discloses a frequency synthesizer tuning system having a microprocessor. The system comprises a variable oscillator and microprocessor coupled thereto for the control thereof, the microprocessor having a programmable counter therein which is used for measuring the output frequency of the variable oscillator. However, no time sharing concept is disclosed in this system.

U.S. Pat. No. 4,479,226, issued to Prabhu et al, discloses a frequency-hopping single side band mobile radio system. The transmitter for this system functions to modulate the input signal by "hopping" it to a different carrier frequency every few seconds while the receiver to the system employs the identical carrier sequence as used by the transmitter to demodulate the transmitter carrier-frequency-hopped SSB signal thereby recovering the original single side band signal.

U.S. Pat. Nos. 2,510,338, issued to Guanella, and 2,530,824, issued to King, both disclose frequency synthesizers using multiple frequency sources. Neither of these systems discloses microprocessor control of the frequency synthesizer. U.S. Pat. Nos. 4,394,776 and 4,403,342, both issued to Borras et al, and U.S. Pat. No. 4,317,221, issued to Toya, all disclose frequency synthesizers and both a transmitter and receiver. They do not, however, disclose any time sharing concept. U.S. Pat. Nos. 4,190,807, issued to Weber, 4,194,151, issued to Gregersen et al, 4,153,884, issued to Ikeguchi et al and 4,081,752 issued to Sumi, all disclose frequency synthesizer systems. However, there is no disclosure of using these systems in a time sharing mode.

U.S. Pat. No. 3,204,034, issued to Ballard et al discloses a multiplexed frequency synthesizer. Neither microprocessor control nor a time sharing concept are disclosed in this reference.

SUMMARY OF THE INVENTION

An object of the present invention is to provide a frequency synthesizer circuit for use in a time shared mode. Thus the frequency synthesizer circuit will operate to transmit and/or receive a particular frequency for a chosen small amount of time and then will sequentially transmit and/or receive the other frequencies for chosen small amounts of time. After all the chosen frequencies have been transmitted and/or received, the synthesizer circuit will return to the first frequency and begin to repeat the process in cyclical fashion.

Another object of the invention is to provide a time sharing receiver utilizing frequency hopping in the receiver circuit.

In a frequency hopping system a carrier frequency is shifted or jumped in discrete increments dictated by prepared code sequences in synchronism with a change in state of the codes. The resulting consecutive and time sequential frequency pattern is called a hopping pattern and the duration of each hopping frequency is called a chip. The transmitted frequency is embedded in the codes or can be embedded in each frequency of a carrier wave by such methods as a so-called FSK (frequency shift keyed) modulation.

Frequency hopping systems in which pseudo-noise code streams generated in a random pattern are transmitted and received are known from U.S. patent application Ser. Nos. 662,753; 662,490; 662,924; and 662,489, all filed on Oct. 19, 1984 by the inventor of the subject application and assigned to the same assignee as the subject application.

Still another object of the present invention is to provide a duplex transmitter/receiver using a common frequency synthesizer.

Another object of the present invention is to provide a frequency synthesizer which makes use of the frequency hopping concept to transmit on a number of channels at respectively different frequencies.

The above objects are attained with respect to the receiver circuit by utilizing the frequency synthesizer which hops at fast rates time sharing and sampling input signals. The input signals could comprise many frequencies and be of different types such as independent mark space signals, frequency modulated signals, or an unknown spectrum of signals. The frequency synthesizer acts as a sampling gate and passes input signals which have a frequency which, when subtracted from the frequency generated at that instant by the synthesizer, yields an intermediate frequency (IF) which the IF amplifier in the system is designed to pass. In order to satisfy the Nyquist criteria for reproducing the input signal without distortion, the input signals are sampled at a frequency which is at least twice the input signal bandwidth.

DETAILED DESCRIPTION OF THE INVENTION

Figure 1:
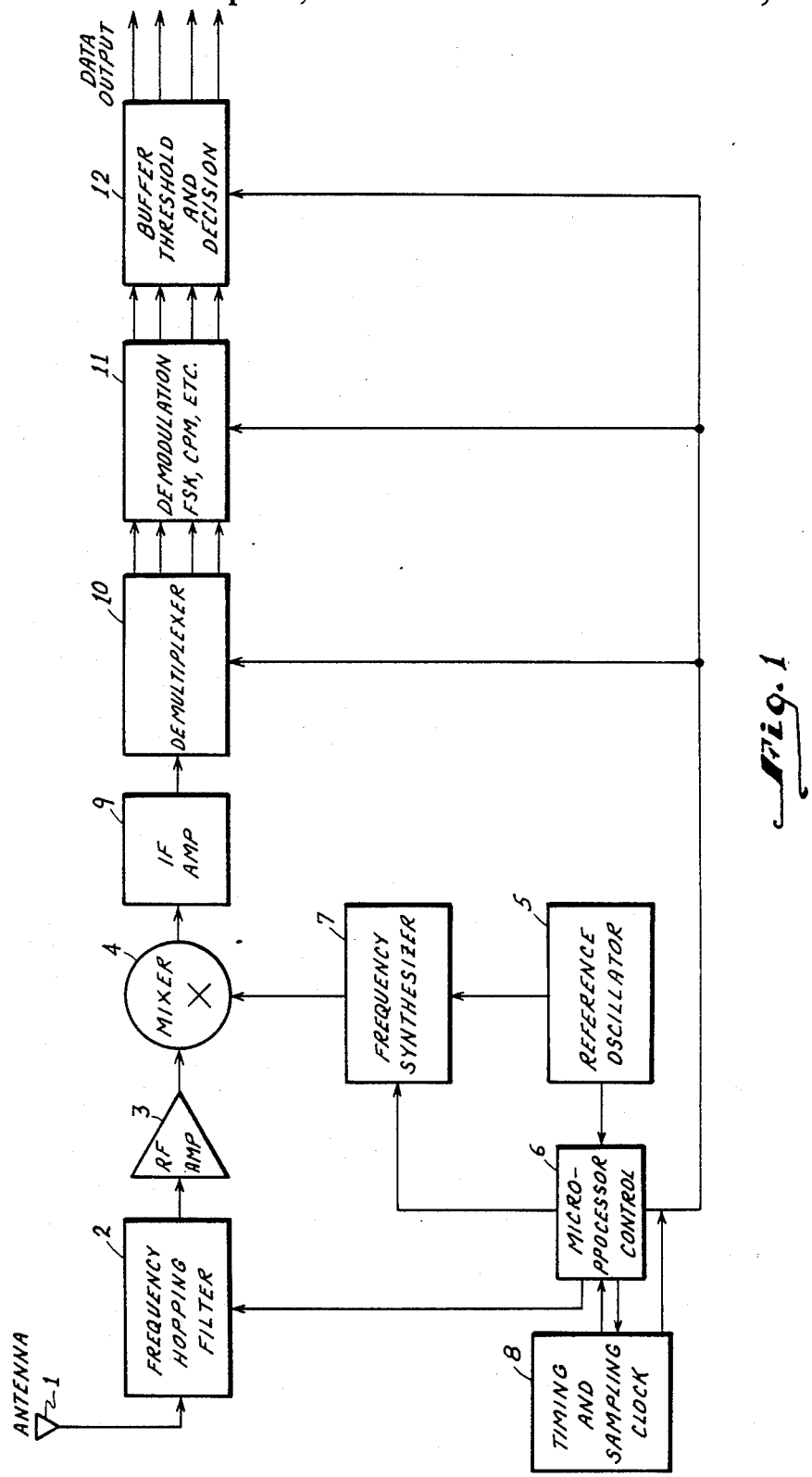
FIG. 1 is a schematic diagram of the time sharing receiver of the invention.

In the circuit of FIG. 1, incoming signals are detected at antenna 1 and brought to frequency hopping filter 2. The tuning of the frequency hopping filter 2 at any particular instant is set by the micro-processor 6 which contains a table of values corresponding to the desired signals to be passed by the frequency hopping filter 2. Filter 2 functions to block image frequencies of the desired frequency which might combine with the synthesizer frequency in mixer 4 to produce the required IF frequency for the receiver. The microprocessor 6 is in turn controlled by timing and sampling clock 8, as well as reference oscillator 5. The filter hopping rate is consistent with the Nyquist criteria and the numbered signals to be sampled.

Simultaneously with the introduction of a new tuning in frequency hopping filter 2, frequency synthesizer 7 inputs a desired frequency to mixer 4 which is heterodyned with the frequency or frequencies obtained through frequency hopping filter 2 and radio frequency amplifier 3. The frequency synthesizer 7, which inputs desired frequencies to the mixer 4 under the control of timing and sampling clock 8, contains circuitry for converting the frequency received from the reference oscillator 5, e.g., 10 megahertz, to the desired frequency.

The frequencies sent by the frequency synthesizer 7 to the mixer 4 are chosen such that the difference between these frequencies and the frequency of an incoming signal which it is desired to reproduce is equal to the intermediate frequency (IF) which is allowed to pass through IF amplifier 9. Frequency synthesizer 7 is also under the control of microprocessor 6, which contains a table of the aforementioned desired frequencies.

After a desired signal or signals passes through IF amplifier 9, the signal or signals are conducted to demultiplexer 10 wherein the signals, if there are more than one, are demultiplexed and sent as individual signals to a bank of demodulators 11. The demodulated signals are in turn conducted to buffer circuit 12, which makes decisions on whether to pass the signals to the circuit output based on their amplitude. The outputs from the buffer circuit 12 may be used as data inputs for a computer or for any other conventional radio signal outputs such as a voice output.

It should be noted that the functions of demultiplexer 10, demodulator 11, and buffer circuit 12 can all be performed under the control of software programmed into microprocessor 6 or another microprocessor (not shown).

A slightly different embodiment of the invention involves the deletion of IF amplifier 9 from FIG. 1 whereby the circuit operates to pass signals at "Zero IF". In this embodiment the frequency hopping filter 2 and mixer 4 operate to pass incoming signals whose frequency is equal to that of the frequency synthesizer.

Figure 2:
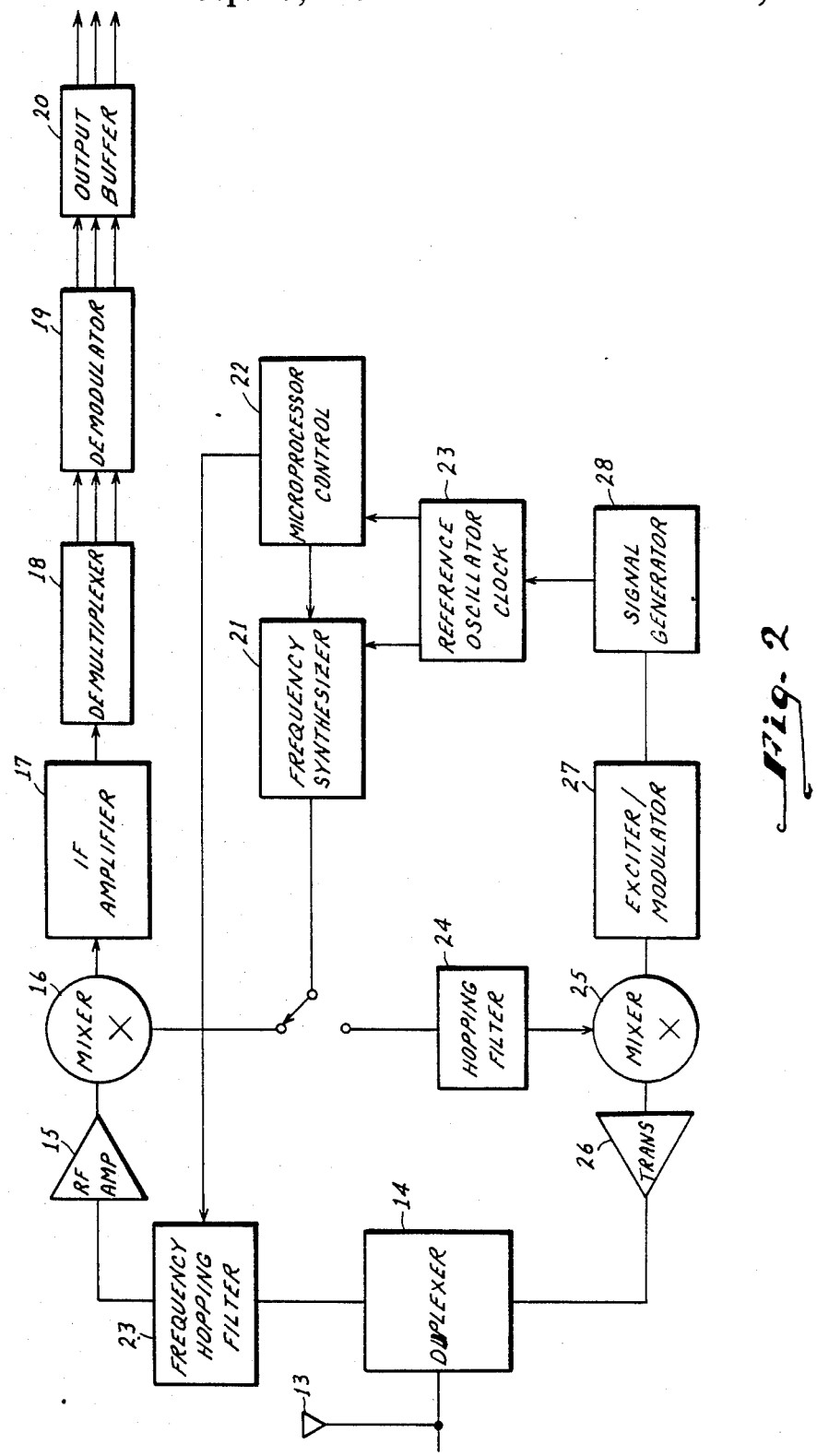
FIG. 2 is a schematic diagram of the duplex transmitter/receiver using a common frequency synthesizer.

FIG. 2 shows a circuit using the time sharing principles of FIG. 1 adapted for a duplex transmitter/receiver. In this circuit incoming signals are detected by antenna 13 and conducted to duplexer 14. From the diplexer 14 the signals are conducted through a frequency hopping filter 23 and radio frequency amplifier 15 where they are heterodyned in mixer 16 with desired frequencies transmitted from frequency synthesizer 21. The frequency synthesizer 21 is under the control of microprocessor 22 and clock reference oscillator 23. Thus the receiver part of this duplex circuit closely resembles the receiver of FIG. 1 except that the clock function is incorporated in reference oscillator 23. In similar fashion to FIG. 1, the heterodyned signal or signals pass through IF amplifier 17, demultiplexer 18, demodulator 19 and output buffer 20.

In the transmitter part of the circuit, a signal generator 28, which is a representation of diverse signal sources such as computer outputs, or a command control system, or a reference oscillator, transmits a signal to exciter/modulator 27. The modulated signal is then combined in mixer 25 with a signal from hopping filter 24 which is under the control of microprocessor 22. The microprocessor 22 contains a table of center frequencies for the hopping filter 24. The heterodyned signal leaves the mixer 25, passes through the transmitter amplifier 26 and the diplexer 14 and is transmitted to the outside environment through antenna 13. In this application the switching rate of the frequency synthesizer is also consistent with the Nyquist criteria.

Figure 3:
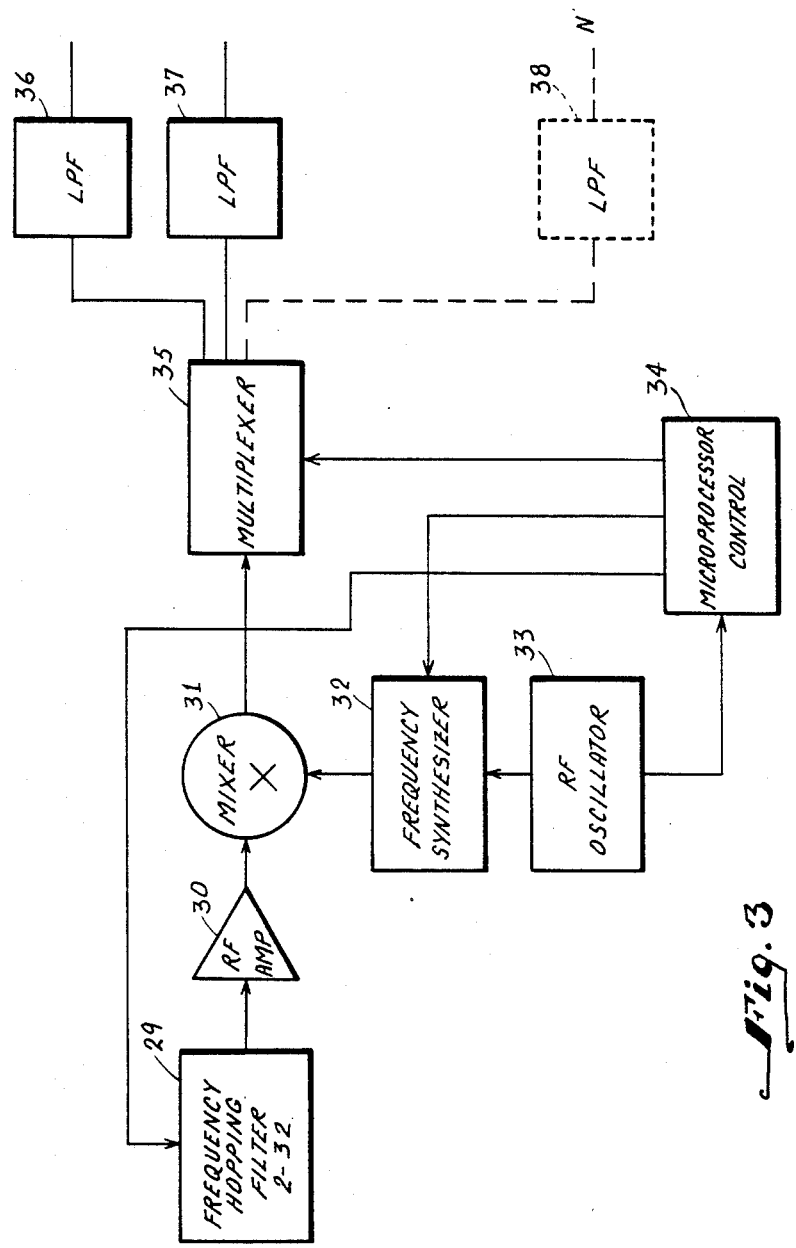
FIG. 3 is a schematic diagram of a single frequency synthesizer being used for a receiver outputting into multiple channels.

FIG. 3 shows an embodiment of the present invention utilizing the time sharing concept for a receiver operating into a multiplicity of channels. In this circuit reference oscillator 33, which has a clock function contained therein, outputs a constant frequency, e.g., 10 megahertz, to frequency synthesizer 32. The frequency synthesizer 32 contains circuitry for converting the reference frequency into desired reception frequencies. The frequency synthesizer 32 is under the control of microprocessor 34, which contains a table of desired frequencies and which operates under the control of the clock function in reference oscillator 33. A microprocessor 34 also contains a table of values representing desired center frequencies for frequency hopping filter 29. The signals passing through frequency hopping filter 29 and radio frequency amplifier 30 are heterodyned with the signals from frequency synthesizer 32 in mixer 31 to obtain desired transmission frequencies. The reception frequencies are sequentially transferred onto various channels through low pass filters 36, 37, and 38 by means of multiplexer 35, which separates the signals on a temporal basis and thus conducts them to their respective individual channels at the appropriate time.

Although this invention has been described and illustrated in detail, it is to be clearly understood that the same is by way of illustration and example only and is not to be taken by way of limitation, the spirit and scope of this invention being limited only by the terms of the appended claims.

I claim:

1. A time sharing frequency synthesizer circuit, comprising:

means for synthesizing a plurality of desired frequencies one at a time for predetermined intervals in a desired sequence, said means comprising a reference oscillator, a microprocessor containing values corresponding to a table of desired output frequencies for a frequency synthesizing device, said microprocessor being connected to an output of said reference oscillator, and a frequency synthesizer which is connected to an output of said reference oscillator and an output of said microprocessor and which contains circuitry for converting the output of said reference oscillator into any desired frequency, means for heterodyning each of said desired frequencies with one or more signals with frequencies within a desired bandwidth to generate intermediate frequencies at a sample rate consistent with the Nyquist criteria of sampling at a frequency at least twice the effective bandwidth; and means for discriminating among said intermediate frequencies.

2. The circuit of claim 1, further comprising a frequency hopping filter connected to receive incoming signals and to convey the incoming signals which pass therethrough to said means for heterodyning, said hopping filter being connected to and controlled by said microprocessor which contains values corresponding to a table of desired center frequencies for said frequency hopping filter.

3. The circuit of claim 2, further comprising clock means for sending time signals to said microprocessor and said frequency synthesizer.

4. The circuit of claim 2, further comprising a second frequency hopping filter connected to the output of said reference oscillator and functioning to restrict outgoing signals from the circuit within desired bandwidths and to convey outgoing signals which pass therethrough to a second heterodyning means, said second frequency hopping filter being connected to and controlled by said microprocessor which contains values corresponding to a table of desired center frequencies for said second frequency hopping filter.

5. The circuit of claim 4, further comprising a duplexer connected to said heterodyning means and to said second heterodyning means enabling signals to be transmitted and received by said time sharing frequency synthesizer circuit through a single antenna.

6. The circuit of claim 2, further comprising means for multiplexing in sequential fashion signals which have passed through said heterodyning means, said means for multiplexing conveying said multiplexed signals to different channels.

7. The circuit of claim 6, further comprising clock means for sending timing signals to said microprocessor and said frequency synthesizer.

* * * * *